United States Patent [19]
Bonekamp et al.

[11] Patent Number: 5,258,137
[45] Date of Patent: Nov. 2, 1993

[54] VISCOELASTIC SURFACTANT BASED FOAM FLUIDS

[75] Inventors: Jeffrey E. Bonekamp; Gene D. Rose; Donald L. Schmidt; Arthur S. Teot, all of Midland, Mich.; Edward K. Watkins, Oakdale, Conn.

[73] Assignee: The Dow Chemical Company, Midland, Mich.

[21] Appl. No.: 848,502

[22] Filed: Mar. 9, 1992

Related U.S. Application Data

[63] Continuation of Ser. No. 199,486, May 27, 1988, abandoned, which is a continuation-in-part of Ser. No. 685,530, Dec. 24, 1984, abandoned.

[51] Int. Cl.$^5$ .................. A62D 1/04; B01F 17/02; B01F 17/18; B01J 13/00
[52] U.S. Cl. ........................... 252/356; 8/477; 252/3; 252/8.05; 252/8.551; 252/307; 252/354; 261/DIG. 26; 406/48; 406/49; 406/197
[58] Field of Search .............. 252/APS 3, APS 8.551, 252/APS 307, 354, 356; 261/DIG. 26; 8/477; 406/48, 49, 197

[56] References Cited

U.S. PATENT DOCUMENTS

| | | | |
|---|---|---|---|
| 2,541,816 | 2/1951 | Glarum et al. | 260/404 X |
| 3,172,910 | 3/1965 | Brace | 252/356 X |
| 3,361,213 | 1/1968 | Savins | 137/13 X |
| 3,373,107 | 3/1968 | Rice et al. | 252/8.551 |
| 3,434,485 | 3/1969 | Lummus | 252/8.551 X |
| 3,562,156 | 2/1971 | Francen | 252/3 X |
| 3,655,554 | 4/1972 | Fink et al. | 252/3 |
| 3,684,018 | 8/1972 | Rainaldi et al. | 252/3 X |
| 3,775,126 | 11/1973 | Babbitt et al. | 106/125 X |
| 3,956,138 | 5/1976 | Crockett | 252/3 |
| 4,090,967 | 5/1978 | Falk | 252/3 |

OTHER PUBLICATIONS

Gravsholt: "Viscoelasticity in Highly Dilute Aqueous Solutions of Pure Cationic Detergents", J. of Colloid and Interface Science, 57(3), pp. 575–577 (1976).

*Primary Examiner*—Richard D. Lovering

[57] ABSTRACT

A foam-fluid composition for use in foam fracture applications and foam slurry transport comprises a thickening amount of a viscoelastic surfactant composition, a functionally effective amount of a surfactant composition capable of forming a foam, and an aqueous liquid. Foam-fluid formulations are easily prepared, reusable, shear stable, easily pumped and form stable foams over a wide temperature range and exhibit high viscosities even at relatively high temperatures.

11 Claims, No Drawings

VISCOELASTIC SURFACTANT BASED FOAM FLUIDS

CROSS-REFERENCE TO RELATED APPLICATION

This is a continuation of U.S. patent application, Ser. No. 07/199,486 filed May 27, 1988 (now abandoned) which is a continuation-in-part of U.S. patent application, Ser. No. 06/685,530, filed Dec. 24, 1984, (now abandoned).

BACKGROUND OF THE INVENTION

The present invention relates to thickened aqueous compositions, and in particular, to those compositions that can provide a foam.

Foams are defined as dispersions of gas in a liquid and are finding numerous uses in a wide variety of industrial applications. Typically, foamed compositions can be prepared by contacting an aqueous liquid with surfactants. Such compositions have very low viscosities. Such low viscosities lead to poor foam stability and foam strength. In order to increase the viscosity of such compositions, it has become common practice to incorporate thickening amounts of polymeric materials into such compositions. Unfortunately, the viscosities of such compositions can change substantially with variations in temperature; and such compositions are shear degradable, can have short shelf lives, are difficult to handle, and can leave a polymeric film or residue after use in a particular application.

In view of the deficiencies of the prior art, it would be highly desirable to provide a foam fluid composition which can be easily formulated to provide foam compositions having good shear stability, and substantial stability over a range of temperatures.

SUMMARY OF THE INVENTION

The present invention is a foam fluid composition comprising a thickening amount of a viscoelastic surfactant, a functionally effective amount of a surfactant capable of forming a foam and an aqueous liquid.

In another aspect, the present invention is a method for producing a foam, the method comprising contacting a thickening amount of a viscoelastic surfactant, a functionally effective amount of a surfactant capable of forming a foam, and an aqueous liquid and subjecting said foam fluid composition to foaming conditions.

The composition of the present invention provides a stable foam which are easily formulated and handled. Specifically, the foam fluid compositions of this invention do not permanently shear degrade and can be refoamed indefinitely. The foams derived from said compositions are stable over a wide temperature range and the compositions can exhibit desirably high viscosities even at relatively high temperatures. The foams can support high amounts of dispersed solids and are subsequently useful for supporting materials such as sand. The foam fluids are highly stable and exhibit essentially no shelf life problems. The foam fluid compositions can be easily handled and easily pumped through conventional apparatus. The foams which form the foam fluids are essentially non-film-forming and do not leave an insoluble residual film after the foam has been used.

The compositions of this invention have a wide variety of uses. Of particular interest are enhanced oil recovery applications such as acidizing applications and in particular foam fracture applications in oil and gas wells, foam slurry for transportation of solid dispersions such as pigment, mineral, coal or sand; and the like. Also of interest are those industrial processes using aqueous foams such as printing, dyeing, sizing such as for carpet-back sizing; or binding of textiles and papers; numerous acid cleaning applications; cleaning metals such as aluminum which are used in the construction of aircraft, railroad cars and the like; cleaning scale from heat exchangers and kettles; in fire fighting applications; and the like.

DETAILED DESCRIPTION OF THE INVENTION

As used herein, the term "fluid" refers to those fluid materials which can be employed in order to foam fluid compositions. Most preferably, the fluid is an aqueous liquid. As Used herein, the term "aqueous liquid" refers to those liquids which contain water. Included within the term are aqueous solutions of inorganic salts and aqueous alkaline or aqueous acidic solutions. Other exemplary aqueous liquids include mixtures of water and a water-miscible liquid such as lower alkanols, e.g., methanol, ethanol or propanol; glycols and polyglycols and the like, provided that such water-miscible liquids are employed in amounts that do not deleteriously affect the viscoelastic properties of the aqueous liquid. Also included are emulsions of immiscible liquids in the aqueous liquid, aqueous slurries of solid particulates such as sand or other minerals, corrosion inhibitors, biocides or other toxicants, and the like. In general, however, water and aqueous alkaline, aqueous acidic or aqueous inorganic salt solutions (i.e., brine solutions) are most beneficially employed as the aqueous liquid herein. Advantageously, the salt concentration is less than about 75 percent by weight of the solution. For some applications it is desirable to employ a concentrated acid solution such as a hydrochloric acid solution. For numerous applications the electrolyte concentration is less than 5 percent by weight of the solution. For many applications the aqueous liquid is water.

Traditionally, engineers and scientists have been concerned with two separate and distinct classes of materials—the viscous fluid and the elastic solid. The simple linear engineering models, Newton's law for flow and Hooke's law for elasticity, worked well because traditional materials (e.g., water, motor oil, and steel) fell in one of these two categories. However, as polymer science developed, scientists realized that these two categories represented only the extremes of a broad spectrum of material properties, and that polymers fell somewhere in the middle. As a result, polymer melts and solutions were characterized as "liviscoelastic". As employed in that context, the term "viscoelastic" refers to polymers that exhibit a combination of viscous (liquid-like) and elastic (solid-like) properties.

As the terms is applied to liquids, "viscoelastic" means a viscous liquid having elastic properties, i.e., the liquid at least partially returns to its original form when an applied stress is released. The property of viscoelasticity is well-known in the art and reference is made to H. A. Barnes et al., *Rheol. Acta,* 1975 14, pp. 53-60 and S. Gravsholt, *Journal of Coll. and Interface Sci.,* 57 (3) pp. 575-6 (1976), which are hereby incorporated by reference for a definition of viscoelasticity and tests to determine whether a liquid possesses viscoelastic properties. Of the test methods specified by these references, one test which has been found to be most useful in determining the viscoelasticity of an aqueous solution consists of swirling the solution and visually observing whether the bubbles created by the swirling recoil after the swirling is stopped. Any recoil of the bubbles indicates viscoelasticity. This has been the traditional test for many years. It is possible to quantify the degree of viscoelasticity a liquid possesses by measuring the time required for the recoil motion to stop, as described in an article by J. Nash, *J. of Appl. Chem.*, 6 pp. 540 (1956).

The phenomenon of viscoelasticity has been discovered in certain aqueous surfactant solutions. Surfactants consist of molecules containing both polar and nonpolar groups. They have a strong tendency to adsorb at liquid-air surfaces, liquid-liquid, or liquid-solid interfaces and thereby lower surface or interfacial tension. Solutions of a surfactant may also form micelles, which are organized aggregates of the surfactant. A selected group of surfactant solutions also impart viscoelasticity to the solution as well. (See S. Gravsholt, *J. Coll. and Interface Sci.*, 57 (3) pp. 575-6 (1976), for a study of various surfactant compositions that impart viscoelasticity to the aqueous solutions.) However, typical surfactant compositions will not inherently possess viscoelastic properties. As reported in H. Hoffman, *Advances in Coll. and Interface Sci.*, 17 pp. 276 (1982), surfactant compositions that impart viscoelastic properties to the solutions are rare. Therefore, although all surfactant compositions will reduce surface tension, few will impart viscoelasticity.

Viscoelasticity is caused by a different type of micelle formation than the usual spherical micelles formed by most surfactants. Viscoelastic surfactants form rod-like or cylindrical micelles in solution. Although cylindrical micelles and spherical micelles have about the same diameter of 50 Å, cylindrical micelles can reach 1,000 to 2,000 Å in length and contain hundreds or thousands of individual surfactant molecules. This high degree of association requires a specific set of conditions that can only be achieved by matching the surfactant composition with a suitable solution environment. Factors which change the solution environment include the type and concentration of electrolyte and the structure and concentration of organic compounds present. A surfactant composition may form cylindrical micelles in one solution to impart viscoelastic properties to it and form spherical micelles in another solution. The solution with the spherical micelles will exhibit normal surfactant behavior and not exhibit viscoelastic properties. A determination of whether a solution is viscoelastic can easily be determined by empirical evaluation as described herein.

The formation of long, cylindrical micelles creates useful rheological properties. First, the liquids containing such viscoelastic surfactants often exhibit reversible shear thinning behavior. This means that under conditions of high stress, such as when the composition is sprayed though a nozzle or sheared in a pump, the composition will exhibit low viscosity. When the conditions of high stress are replaced, with conditions of low stress, such as obtained when the composition has left the nozzle and is subjected to atmospheric conditions, the composition will exhibit high viscosity. Secondly, viscoelastic surfactants will remain stable despite repeated high shear applications. Alternatively, typical polymeric thickeners will irreversibly degrade when subjected to high shear.

Surfactants which are capable of imparting viscoelastic properties to a fluid are well-known in the art and reference is made thereto for the purposes of this invention. Illustrative of references which teach viscoelastic surfactants are U.S. Pat. Nos. 361,213; 3,273,107; 3,406,115; 4,061,580 and 4,534,875.

The viscoelastic surfactants can be either ionic or nonionic. In general, an ionic viscoelastic surfactant comprises a surfactant compound having a hydrophobic moiety chemically bonded to an ionic, hydrophilic moiety (hereinafter referred to as a "surfactant ion") and an amount and type of a counterion having a moiety capable of associating with the surfactant ion sufficient to form a viscoelastic surfactant. A nonionic viscoelastic surfactant comprises a surfactant ion having a hydrophobic moiety chemically bonded to a nonionic, hydrophilic moiety.

Examples of ionic surfactant compounds are represented by the formula:

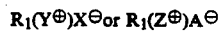

$$R_1(Y^\oplus)X^\ominus \text{ or } R_1(Z^\ominus)A^\oplus$$

wherein $R_1(Y^\oplus)$ and $R_1(Z^\ominus)$ represent surfactant ions having a hydrophobic moiety represented by $R_1$ and an ionic, solubilizing moiety represented by the cationic moiety ($Y^\oplus$) or the anionic moiety ($Z^\ominus$) chemically bonded thereto. $X^\ominus$ and $A^\oplus$ are the counterions associated with the surfactant ions.

In general, the hydrophobic moiety (i.e., $R_1$) of the surfactant ion is hydrocarbyl or inertly substituted hydrocarbyl wherein the term "inertly substituted" refers to hydrocarbyl radicals having one or more substituent groups, e.g., halo groups such as —F, —Cl or —Br or chain linkages, such as a silicon linkage (—Si—), which are inert to the aqueous liquid and components contained therein. Typically, the hydrocarbyl radical is an aralkyl group or a long chain alkyl or inertly substituted alkyl, which alkyl group is generally linear and have at least about 12, advantageously at least about 16, carbon atoms. Representative long chain alkyl and alkenyl groups include dodecyl (lauryl), tetradecyl (myristyl), hexadecyl (cetyl), octadecenyl (oleyl), octadecyl (stearyl) and the derivatives of tallow, coco and soya. Preferred alkyl and alkenyl groups are generally alkyl and alkenyl groups having from about 14 to about 24 carbon atoms, with octadecyl, hexadecyl, erucyl and tetradecyl being the most preferred.

The cationic, hydrophilic moieties (groups), i.e., ($Y^\oplus$), are generally onium ions wherein the term "ionium ions" refers to a cationic group which is essentially completely ionized in water over a wide range of pH, e.g., pH values from about 2 to about 12. Representative onium ions include quaternary ammonium groups, i.e., —N$^\oplus$O(R)$_3$; tertiary sulfonium groups, i.e., —S$^\oplus$(R)$_2$; quaternary phosphonium groups, i.e., —P$^\oplus$O(R)$_3$ and the like, wherein each R is individually a hydrocarbyl or inertly substituted hydrocarbyl. In addition, primary, secondary and tertiary amines, i.e., —NH$_2$, —NHR or —N(R)$_2$, can also be employed as the ionic moiety if the pH of the aqueous liquid being used is such that the amine moieties will exist in ionic form or at least partially in ionic form. A pyridinium moiety can also be employed. Of such cationic groups, the surfactant ion of the viscoelastic surfactant is preferably prepared having quaternary ammonium, i.e., —N$^\oplus$(R)$_3$; a pyridinium moiety; an aryl- or alkaryl pyridinium; or imidazolinium moiety; or tertiary amine, —N(R)$_2$ groups wherein each R is independently an alkyl group or hydroxyalkyl group having from 1 to about 4 carbon atoms, with each R preferably being methyl, ethyl or hydroxyethyl.

Representative anionic, solubilizing moieties (groups) (Z⊖) include sulfate groups, i.e., $-OSO_3^\ominus$, ether sulfate groups, sulfonate groups, i.e. $-SO_3^\ominus$, carboxylate groups, phosphate groups, phosphonate groups, and phosphonite groups. Of such anionic groups, the surfactant ion of the viscoelastic surfactants is preferably prepared having a carboxylate or sulfate group. For purposes of this invention, such anionic solubilizing moieties are less preferred than cationic moieties.

Fluoroaliphatic species suitably employed in the practice of this invention include organic compounds represented by the formula:

$$R_f Z^1$$

wherein $R_f$ is a saturated or unsaturated fluoroaliphatic moiety, preferably containing a $F_3C-$ moiety and $Z^1$ is an ionic moiety or potentially ionic moiety. The fluoroaliphatics can be perfluorocarbons. Suitable anionic and cationic moieties will be described hereinafter. The fluoroaliphatic moiety advantageously contains from about 3 to about 20 carbons wherein all can be fully fluorinated, preferably from about 3 to about 10 of such carbons. This fluoroaliphatic moiety can be linear, branched or cyclic, preferably linear, and can contain an occasional carbon-bonded hydrogen or halogen other than fluorine, and can contain an oxygen atom or a trivalent nitrogen atom bonded only to carbon atoms in the skeletal chain. More preferable are those linear perfluoroaliphatic moieties represented by the formula: $C_nF_{2n+1}$ wherein n is in the range of about 3 to about 10. Most preferred are those linear perfluoroaliphatic moieties represented in the paragraphs below.

The fluoroaliphatic species can be a cationic perfluorocarbon and is preferably selected from the group consisting of $CF_3(CF_2)_rSO_2NH(CH_2)_sN^\oplus R''_3 X^\ominus$; $R_fCH_2CH_2SCH_2CH_2N^\oplus R''_3 X^\ominus$ and $CF_3(CF_2)_rCONH(CH_2)_sN^\oplus R''_3 X^\ominus$; wherein $X^\ominus$ is a counterion described hereinafter, R'' is lower alkyl containing between 1 and about 4 carbon atoms, r is about 2 to about 15, preferably about 2 to about 6, and s is about 2 to about 5. Examples of other preferred cationic perfluorocarbons, as well as methods of preparation, are those listed in U.S. Pat. No. 3,775,126.

The fluoroaliphatic species can be an anionic perfluorocarbon and is preferably selected from a member of the group consisting of $CF_3(CF_2)_pSO_2O^\ominus A^\oplus$, $CF_3(CF_2)_pCOO^\ominus A^\oplus$, $CF_3(CF_2)_pSO_2NH(CH_2)_qSO_2O^\ominus A^\oplus$ and $CF_3(CF_2)_pSO_2NH(CH_2)_qCOO^\ominus A^\oplus$; wherein p is from about 2 to about 15, preferably about 2 to about 6, q is from about 2 to about 5, and $A^\oplus$ is a counterion described hereinafter. Examples of other preferred anionic perfluorocarbons, as well as methods of preparation, are illustrated in U.S. Pat. No. 3,172,910.

The counterions (i.e., $X^\ominus$ or $A^\oplus$) associated with the surfactant ions are most suitably ionically charged, organic materials having ionic character opposite that of the surfactant ion, which combination of counterion and surfactant ion imparts viscoelastic properties to an aqueous liquid. The organic material having an anionic character serves as the counterion for a surfactant ion having a cationic, hydrophilic moiety, and the organic material having a cationic character serves as the counterion for the surfactant ion having an anionic, hydrophilic moiety. In general, the preferred counterions exhibiting an anionic character contain a carboxylate, sulfonate or phenoxide group wherein a "phenoxide group" is $ArO^\ominus$ and Ar represents an aromatic ring or inertly substituted aromatic ring. Representative of such anionic counterions which, when employed with a cationic surfactant ion, are capable of imparting viscoelastic properties to an aqueous liquid include various aromatic carboxylates such as o-hydroxybenzoate; m- or p-chlorobenzoate, methylene bis-salicylate and 3,4-, 3,5- or 2,4-dichlorobenzoate; aromatic sulfonates such as p-toluene sulfonate and naphthalene sulfonate; phenoxides, particularly substituted phenoxides; and the like, where such counterions are soluble; or 4-amino-3,5,6-trichloropicolinate. Alternatively, the cationic counterions can contain an onium ion, most preferably a quaternary ammonium group. Representative cationic counterions containing a quaternary ammonium group include benzyl trimethyl ammonium or alkyl trimethyl ammonium wherein the alkyl group is advantageously octyl, decyl, dodecyl, erucyl, and the like; and amines such as cyclohexyl amine. It is highly desirable to avoid stoichiometric amounts of surfactant and counterion when the alkyl group of the counterion is large. The use of a cation as the counterion is generally less preferred than the use of an anion as the counterion. Inorganic counterions, whether anionic or cationic, can also be employed.

The specific type and amount of surfactant ion and the counterion employed to prepare a viscoelastic surfactant are interrelated and are selected such that the combination imparts viscoelastic properties to an aqueous liquid. The combinations of surfactant ions and the counterions which will form a viscoelastic surfactant will vary and are easily determined by the test methods hereinbefore described.

Of the various surfactant ions and counterions which can be employed in preparing a viscoelastic surfactant, the preferred viscoelastic surfactants include those represented by the formula:

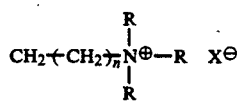

wherein n is an integer from about 13 to about 23, preferably an integer from about 15 to about 21; each R is independently hydrogen or an alkyl group, or alkylaryl, or a hydroxyalkyl group having from 1 to about 4 carbon atoms, preferably each R is independently methyl, hydroxyethyl, ethyl or benzyl, and $X^\ominus$ is o-hydroxy benzoate, m- or p-halobenzoate or an alkylphenate wherein the alkyl group is advantageously from 1 to about 4 carbon atoms. In addition, each R can form a pyridinium moiety. Especially preferred surfactant ions include cetyl trimethyl ammonium, oleyl trimethyl ammonium, erucyl trimethyl ammonium and cetyl pyridinium.

Other preferred viscoelastic surfactants include those represented by the formula:

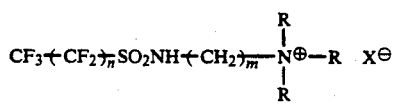

wherein n is an integer from about 3 to about 15, preferably from about 3 to about 8; m is an integer from about 2 to about 10, preferably from about 2 to about 5; R is as previously defined, most preferably methyl; and $X^\ominus$ is as previously defined.

The viscoelastic surfactants are easily prepared by admixing the basic form of the desired cationic surfactant ion (or acidic form of the desired anionic surfactant ion) with an amount of the acidic form of the desired cationic counterion (or the basic form of the desired anionic counterion). Alternatively, the desired amounts of the salts of the cationic surfactant ion and the anionic counterion (or desired amounts of the anionic surfactant ion and cationic counterion) can be admixed to form the desired viscoelastic surfactant. See, for example, the procedures described in U.S. Pat. No. 2,541,816.

Depending on the specific surfactant ion and counterion associated therewith, less than a stoichiometric amount of the counterion can be employed to impart viscoelastic properties to a liquid. For example, when the surfactant ion is a long chain alkyl bonded to a quaternary ammonium and the counterion is an aromatic salicylate, although greater than stoichiometric amounts of an electrolyte which generates, upon dissociation, a salicylate anion, can be employed, water and other aqueous liquids can be effectively thickened using stoichiometric or even lesser amounts of the electrolyte. In fact, when the counterion contains an alkyl group which is greater than about 4 carbon atoms, lesser than stoichiometric amounts of the counterion are advantageously employed. However, in many instances, particularly when the counterion is an inorganic ion such as chloride ion, viscoelastic properties are imparted to an aqueous liquid only when an electrolyte is employed in stoichiometric excess. For example, in such instances, the surfactant may not impart desired viscoelastic properties to water, but will impart desired viscoelastic properties to a salt solution such as brine. As the term is used herein, "viscoelastic surfactant" refers, if the counterion is employed in stoichiometric or lesser amounts, only to the surfactant ion and that amount of counterion actually employed or, if more than stoichiometric amounts of electrolyte are employed to the surfactant ion and the stoichiometric amount of counterion (i.e., it excludes the excess amount, if any, of electrolyte).

In general, surfactant compounds having a hydrophobic moiety chemically bonded to a nonionic. hydrophilic moiety are those nonionic surfactants which exhibit a viscoelastic character, and are typically described in U.S. Pat. No. 3,373,107; and those alkylphenyl ethoxylates as are described by Shinoda in *Solvent Properties of Surfactant Solutions*, Marcel Dekker, Inc. (1967), which are incorporated herein by reference. Preferred nonionic surfactants are those tertiary amine oxide surfactants which exhibit viscoelastic character. In general, the hydrophobic moiety can be represented as the previously described $R_1$. It is understood that the nonionic surfactant can be employed in the process of this invention in combination with an additional amount of an electrolyte as described hereinafter. It is also desirable to employ an additive such as an alkanol in the aqueous liquid to which the nonionic surfactant is added in order to render the surfactant viscoelastic.

Other viscoelastic surfactants which can be employed in the process of this invention include the zwitterionic surfactant systems such as are described by D. Saul et al., *J. Chem. Soc.* Faraday Trans., 1 (1974) 70(1), pp 163-170.

The viscoelastic surfactant (whether ionic or nonionic in character) is employed in an amount sufficient to to measurably increase the viscosity of (i.e., "thicken") the fluid as it is employed in foamed fluid applications. The specific viscoelastic surfactant employed and the concentration thereof in the fluid are dependent on a variety of factors including solution composition, temperature, and shear rate to which the flowing fluid may be subjected. In general, the concentration of any specific viscoelastic surfactant most advantageously employed herein is easily determined by experimentation. In general, the viscoelastic surfactant compositions are preferably employed in amounts ranging from about 0.1 to about 10 weight percent based on the weight of the surfactant composition and fluid. The viscoelastic surfactant composition is more preferably employed in amounts from about 0.5 to about 5 percent based on the weight of the fluid and the viscoelastic surfactant composition.

Typically, the viscosity of the foam fluid composition ranges over a wide range of viscosities. The viscosity of said composition can vary and will depend upon the application, and can range from thicker than that of the liquid to which the surfactant components are added to too thick to measure.

As mentioned, the viscoelastic surfactant can be prepared using greater than stoichiometric amounts of an electrolyte having an ionic character opposite to that of the surfactant ion and which is capable of being associated as a counterion (e.g., an organic counterion) with the surfactant ion and, in some cases, greater than stoichiometric amounts may be required to actually impart viscoelastic properties to the fluid.

In addition, the use of additional amounts of electrolyte will allow the fluid to maintain its viscosity or elasticity at a higher temperature than if no additional electrolyte is employed. Such electrolytes most suitably employed herein include those containing an ion (e.g., organic ion) which, when associated with the surfactant ion, forms a viscoelastic surfactant. In general, electrolytes (including salts, acids and bases) which form, upon dissociation, organic ions opposite in charge to the surfactant ion are preferred. For example, an organic electrolyte which, upon dissociation, forms an anion will further increase the viscosity of a fluid containing a viscoelastic surfactant having a cationic surfactant ion. Examples of such anionic organic electrolytes include the alkali metal salts of various aromatic carboxylates such as the alkali metal aromatic carboxylates, e.g., sodium salicylate, potassium salicylate and disodium methylene-bis(salicylate); alkali metal ar-halobenzoates, e.g., sodium p-chlorobenzoate, potassium m-chlorobenzoate, sodium 2,4-dichlorobenzoate and potassium 3,5-dichlorobenzoate; aromatic sulfonic acids such as p-toluene sulfonic acid and the alkali metal salts thereof; naphthalene sulfonic acid; substituted phenols, e.g., ar,ar-dichlorophenols, 2,4,5-trichlorophenol, t-butylphenol, t-butylhydroxyphenol, ethylphenol, and the like.

Alternatively, a cationic organic electrolyte which, upon dissociation, forms a cation is also useful to further increase the viscosity of a fluid containing a viscoelastic surfactant having an anionic surfactant ion. While cationic organic electrolytes are less preferred than the aforementioned anionic organic electrolytes, examples of suitable cationic electrolytes include the quaternary ammonium salts such as alkyl trimethyl ammonium halides and alkyl triethyl ammonium halides wherein the alkyl group advantageously contains 4 to 22 carbons and the halide advantageously is chloride; aryl and aralkyl trimethyl ammonium halides such as phenyl trimethyl and benzyl trimethyl ammonium chloride; alkyl trimethyl phosphonium halides and the like. Also desirable is cyclohexylamine. It is highly desirable to avoid stoichiometric amounts of surfactant and counterion when the alkyl group of the counterion is large (i.e., greater than about 8).

Preferably, the electrolyte is the same or aenerates the same ion associated with the surfactant ion of the viscoelastic surfactant contained by the aqueous liquid, e.g., alkali metal salicylate is advantageously employed as the additional organic electrolyte when the viscoelastic surfactant is originally prepared having a salicylate counterion. Therefore, the most preferred organic electrolytes are the alkali metal salts of an aromatic carboxylate or an aromatic sulfonate, for example, sodium salicylate or sodium p-toluene sulfonate. However, it is also understood that the electrolyte can be different from the counterion which is employed.

The concentration of the additional (e.g., organic) electrolyte required in the fluid to impart the further increase in viscoelasticity and increase the temperature to which the fluid will maintain its viscosity is dependent on a variety of factors including the particular fluid, viscoelastic surfactant and electrolyte employed, and the achieved viscosity. In general, the concentration of the additional electrolyte will range from about 0.1 to about 20, preferably from about 0.5 to about 5, moles per mole of the viscoelastic surfactant ion. It is understood that if additional counterion is employed to provide the aforementioned properties to the composition, the amount of foaming which the composition exhibits can be reduced.

Foaming properties can be provided to the foam fluid composition using a surfactant which is capable of forming a foam. In general, the surfactants which are capable of forming a foam are not capable of forming a viscoelastic surfactant. Alternatively, but less preferably, a surfactant which is capable of forming a viscoelastic surfactant can be employed at conditions at which the surfactant exhibits a greater propensity for forming a foam than for forming a viscoelastic surfactant. For example, a combination of a surfactant containing an unsubstituted hydrocarbyl hydrophobic moiety and a surfactant containing a fluoroaliphatic hydrophobic moiety can be employed in order to provide thickening properties and foaming properties, respectively. Additionally, for example, a surfactant ion can be employed in combination with a counterion capable of forming a viscoelastic surfactant composition (e.g., an organic counterion) and a counterion capable of forming a surfactant composition exhibiting foaming properties (e.g., an inorganic counterion) or the surfactant ions can be different while the counterion (i.e., electrolyte) can be the same or different. For example, an erucyl trimethyl ammonium surfactant ion can be employed with both salicylate and chloride counterions in preparing a foam-forming viscoelastic surfactant composition. It is understood that combinations of various surfactants and combinations of various counterions can provide compositions exhibiting varying amounts of thickening and foaming properties.

Preferably, the viscoelastic surfactant composition and the foam-forming surfactant are comprised of ionic surfactants. The ionic surfactant in each case can be the same or different from one another but is preferably different. Also desirable is a composition wherein the viscoelastic surfactant comprises an ionic surfactant and the foam-forming surfactant comprises a nonionic surfactant. Somewhat less desirable is a composition wherein the viscoelastic surfactant comprises a nonionic surfactant and the foam-forming surfactant comprises an ionic surfactant. Also useful is a composition wherein both the viscoelastic surfactant and the foam-forming surfactant comprise nonionic surfactants.

The amount of foam-forming surfactant which is employed can vary depending upon factors such as the amount and type of foam which is desired, the type of foam-forming surfactant which is employed, the means used for preparing the foam, and the like. Typically, the amount of foam-forming surfactant ranges from greater than 0 to about 5 percent more preferably from about 0.5 to about 3 percent, based on the weight of the fluid and the surfactants.

Foams of this invention are prepared by contacting the fluid with the viscoelastic surfactant and the foam-forming surfactant. Typically, the fluid is transparent. Foaming of the composition is provided by incorporating a gaseous material (e.g., nitrogen, carbon dioxide or air) into the composition. This is typically provided by subjecting the composition to high rates of agitation. The resulting foams are typically not transparent. The extent of foaming can vary in order to provide low density foams or high density foams depending upon the application which is desired. Foams typically comprise between about 20 and about 95 volume percent gas, based on the volume of the liquid and the gas. For example, in a fracturing fluid application, the amount of gaseous material incorporated into foamed composition ranges from about 30 to about 90, most typically from about 60 to about 80 volume percent of the composition.

If desired, foams can be prepared by incorporating a foaming agent or blowing agent into the foam fluid composition. For example, blowing agents which provide gases such as nitrogen, carbon monoxide, carbon dioxide, fluorocarbons, and the like, upon reaction or decomposition can be employed in providing, foamed compositions. For example, blowing agents such as sodium carbonate, ammonium carbonate, sodium bicarbonate, magnesium bicarbonate, zinc carbonate, potassium bicarbonate, and the like can be contacted with the foam fluid composition, which composition is in further contact with an acid material such that carbon dioxide gas is provided during neutralization.

The use of the compositions of this invention is particularly desirable because a low viscosity concentrate can be diluted and essentially instantaneously provide the viscosity required for use. Such a property is particularly desirable in applications where it is necessary to provide a fluid having good flowability during handling operations such as pumping, etc. In addition, the composition can support high amounts of solids (e.g., such as sand) for extended periods of time and over a relatively broad temperature range.

The use of the compositions of this invention is desirable because a liquid containing solid particles (e.g., such as sand) can be thickened and subsequently foamed. Particularly desirable uses of a viscoelastic surfactant-containing composition include those applications wherein a liquid containing a solid material such as sand can be refoamed.

The foamed viscoelastic surfactant-containing compositions of this invention, when mixed with a solid material such as sand, surprisingly provide a high floc volume of solid upon settling of said solid. The loosely packed settled solid can be subjected to refoaming conditions. That is, liquid/solid mixture or slurry can be readily subjected to refoaming conditions and refoamed, and the flowability of the slurry can be reinitiated. Such slurries are relatively easy to pump while maintaining good suspension stability.

ILLUSTRATIVE EMBODIMENTS

The following examples are presented to further illustrate but not limit the scope of this invention. All parts and percentages are by weight unless otherwise indicated.

EXAMPLE 1

An aqueous viscoelastic surfactant composition is prepared by combining with stirring 0.77 percent erucyltrimethyl ammonium hydroxide and 98.59 percent water, and adding 0.27 percent salicylic acid to the agitated mixture. The mixture is heated to 90° C. for 2 hours and then cooled to room temperature. To this is added a foaming composition comprising 0.30 percent of a surfactant having the structure:

$$R_FCH_2CH_2SCH_2CH_2N^{\oplus}-(CH_3)_3CH_3SO_4^{\ominus}$$

wherein $R_F$ is $F(CF_2CF_2)_n$ where n varies from 3 to 8, and is sold commercially as Zonyl FSC surfactant by duPont and 0.07 percent sodium salicylate. The mixture is agitated gently until well mixed. To this mixture is added salicylic acid until a pH of about 7 is obtained. Viscosity values of the composition at various temperatures are presented in Table I.

TABLE I

| Temperature (°C.) | Viscosity of Fluid① (cps) | |
| --- | --- | --- |
| | Viscoelastic Surfactant Composition | Commercial Fluid |
| 25 | 29.1 | 41.2 |
| 40 | 27.2 | 31.4 |
| 55 | 30.2 | 14.6 |
| 70 | 20.8 | 8.4 |

①Viscosity is measured using a Haake Rotovisco RV-3 rotational viscometer with the NV system at 172 sec$^1$ shear rate.
②Commercial fluid comprises xanthum gum as a 0.5 percent solution in an aqueous liquid The data in Table I indicate that the viscosity of the viscoelastic surfactant-containing composition is more stable with increasing temperature as compared to the commercial thickener. The superior stability to temperature is believed to provide foam stability and sand support at elevated downhole temperature ranges such as are experienced in oil well fracturing applications.

EXAMPLE 2

A simulated fracturing fluid is prepared and evaluated for its ability to support sand using the following method: To 20 g of the viscoelastic surfactant composition of Example 1 is added 24 (9 ml dry) of sand, and the slurry is foamed using a Hamilton Beach Blender at high speed. The aqueous viscoelastic surfactant composition (prior to the addition of the sand) exhibits a viscosity of 61.4 cps at 170 sec$^{-1}$ and 26.6 cps at 500 sec$^{-1}$ as measured using a Fann 35A rotational viscometer at 77° F. The initial volume of the foamed slurry is 39 ml at 77° F. After 100 minutes, 90 percent of the sane settles to the lower 45 percent of the foam volume. A similar sample is foamed at 160° F. using similar techniques in order to provide a foamed slurry having an initial volume of 43 ml. After 31 minutes at 160° F., 90 percent of the sand settles to the lower 44 percent of the foam volume. The sample at 77° F. is allowed to stand overnight in order to provide a sand pack volume of 16 ml.

For purposes of comparison, a commercially available formulation containing the previously described Xanthan gum exhibits a viscosity of 54.9 cps at 170 sec$^{-1}$ and 25.5 cps at 500 sec$^{-1}$ as measured using a Fann 35A rotational viscometer at 77° F. To 20 g of the formulation is added 24 g of sand and the slurry is foamed using a Hamilton Beach Blender at high speed at 7720 F. Essentially no settling of the sand is observed after 180 minutes. A similar sample is foamed at 160° F. using similar techniques in order to provide an initial foam volume of 65 ml. After 50 minutes at 160° F., 90 percent of the same settles into the lower 15 percent of the foam volume. The sample at 77° F. is allowed to stand overnight in order to provide a sand pack volume of 10 ml.

The data indicate that the viscoelastic surfactant-containing sample exhibits a moderate viscosity at 77° F. allowing it to be pumped to above ground temperatures while providing good sand suspension ability at elevated temperatures such as are experienced under fracturing temperatures. The data indicate that the viscoelastic surfactant-containing sample provides a slurry sample having a large sand pack volume, making it easier to resuspend the settled material and/or refoam the slurry.

Thus, although the formulations have similar room temperature viscosities, the viscoelastic surfactant-containing formulations maintain viscosity and are capable of supporting sand at those elevated temperatures such as experienced in downhole applications. The viscoelastic surfactant-containing formulations provide relatively large sand packing volumes, and hence such formulations can be refoamed and solids can be resuspended in a relatively easy fashion.

EXAMPLE 3

An aqueous viscoelastic surfactant composition is prepared by combining 2.25 percent erucyl trimethyl ammonium salicylate, 1 percent erucyl trimethyl ammonium chloride, 0.01 of the fluorinated surfactant described in Example 1 and 96.74 percent water. The viscoelastic surfactant-containing composition exhibits a viscosity of 56.5 cps at 82° F. and 52.5 cps at 140° as measured using the Fann 35A rotational viscometer at a 170 sec$^{-1}$ shear rate.

The sample is subjected to foaming at high speed in a blender in order to provide a foam containing 82 percent air by volume. A sample subjected to saturation with carbon dioxide gas and mixing with a blender yields a foam containing 70 gas by volume. The resulting mixture has a slow drainage time at 77° F. indicating that the formulation can be employed in fracturing applications using carbon dioxide foams.

The foamed slurry exhibits sand settling properties similar to those exhibited by the viscoelastic surfactant containing sample of Example 2.

The emulsion break out time of the sample of this example is similar to that of a commercially available Xanthan gum containing fluid.

The example illustrates that various anions can be employed with a common surfactant in order to provide thickening behavior and foaming properties.

What is claimed is:

1. A foam fluid composition comprising a thickening amount of a non-fluorinated, ionic, viscoelastic surfactant comprising a surfactant ion having a hydrophobic moiety chemically bonded to an ionic, hydrophilic moiety, and an amount and type of an organic counterion having an organic moiety capable of associating with the surfactant ion sufficient to form a viscoelastic surfactant, a functionally effective amount of a surfactant capable of forming a foam and an aqueous liquid.

2. The foam fluid composition of claim 1 wherein the composition contains a stoichiometric excess of the counterion.

3. The foam fluid composition of claim 1 wherein the counterion is generated from an electrolyte which forms, upon dissociation, organic ions having an ionic character opposite to that of the surfactant ion and which is capable of being associated as a counterion with the surfactant ion.

4. The composition of claim 3 wherein the electrolyte is sodium salicylate.

5. The composition of claim 1 which further comprises a particulate solid material.

6. The composition of claim 1 wherein the viscoelastic surfactant is a non-fluorinated, cationic, viscoelastic surfactant represented by the formula:

$$R_1(Y^\oplus)X^\ominus$$

wherein $R_1$ is a hydrophobic moiety, $Y^\oplus$ is a cationic solubilizing moiety chemically bonded to $R_1$, and $X^\ominus$ is a counterion associated with $Y^\oplus$ and the viscoelastic surfactant is employed in an amount from about 0.1 to about 10 weight percent based on the weight of the surfactant composition and fluid.

7. The composition of claim 6 wherein $R_1$ is saturated or unsaturated alkyl containing from about 14 to about 24 carbon atoms.

8. The composition of claim 6 wherein the viscoelastic surfactant is cetyl trimethyl ammonium salicylate or erucyl trimethyl ammonium salicylate.

9. The composition of claim 1 wherein the viscoelastic surfactant is a non-fluorinated, anionic, viscoelastic surfactant represented by the formula:

$$R_1(Z^\ominus)A^\oplus$$

wherein $R_1$ is a hydrophobic moiety, $Z^\ominus$ is an anionic solubilizing moiety chemically bonded to $R_1$, and $A^\oplus$ is a counterion associated with $Z^\ominus$ and the viscoelastic surfactant is employed in an amount from about 0.1 to about 10 weight percent based on the weight of the surfactant composition and fluid.

10. The composition of claim 9 wherein $R_1$ is saturated or unsaturated alkyl containing from about 14 to about 24 carbon atoms.

11. The foam fluid composition of claim 1 wherein the composition comprises from about 0.1 to about 10 weight percent of the viscoelastic surfactant, based on the weight of the aqueous liquid and the viscoelastic surfactant.